United States Patent [19]
Geberth, Jr.

[11] Patent Number: 4,908,538
[45] Date of Patent: Mar. 13, 1990

[54] TOTALLY ENCLOSED ELECTRIC MOTOR

[76] Inventor: John D. Geberth, Jr., 10 Goose Cove La., Ramsey, N.J. 07446

[21] Appl. No.: 317,184

[22] Filed: Feb. 28, 1989

[51] Int. Cl.$^4$ .............................................. H02K 9/00
[52] U.S. Cl. ...................................... 310/59; 310/62; 310/63; 310/88; 310/89; 310/227
[58] Field of Search ...................... 310/52, 58, 59, 62, 310/63, 88, 89, 90, 43, 50, 40 MM, 227, 248, 239, 166, 177, 233

[56] References Cited

U.S. PATENT DOCUMENTS

| | | | |
|---|---|---|---|
| 3,344,291 | 9/1967 | Pratt | 310/43 |
| 3,673,447 | 6/1972 | Zumbach | 310/89 |
| 3,739,208 | 6/1973 | Shartrand | 310/58 |
| 4,311,935 | 1/1982 | Hoyss | 310/239 |
| 4,546,280 | 10/1985 | Pfluger | 310/43 |
| 4,705,893 | 11/1987 | Franz | 310/239 |
| 4,742,257 | 5/1988 | Carpenter . | |

FOREIGN PATENT DOCUMENTS 0199450 12/1982 Japan ................................. 310/227

Primary Examiner—R. Skudy
Attorney, Agent, or Firm—Collard, Roe & Galgano

[57] ABSTRACT

There is provided a totally enclosed electric motor which is effectively cooled by means of an internal ventilation system and an external ventilation system. The internal ventilation system includes an internal fan driven by the rotor which forces internal ventilating air into and along an annular series of longitudinal internal ducts arranged adjacent to the internal cylindrical wall supporting the stator. The internal ventilating air leaving the internal ducts enters a brush compartment where the air is directed axially over the commutator and through the stator-rotor arrangement and back to the internal fan. The external ventilation system includes an external fan driven by the rotor which forces external ventilating air from the atmosphere into and along an annular series of longitudinal external ducts arranged radially outwardly from the series of internal ducts and into exhaust compartments at the far axial end of the motor.

16 Claims, 8 Drawing Sheets

TOTALLY ENCLOSED ELECTRIC MOTOR

The present invention relates to a totally enclosed, fan cooled electric motor and, more particularly, it relates to an effective cooling system for a totally enclosed electric motor.

Basically, the types of electric motors used are a-c induction, direct current and universal motors. Universal type electric motors are adapted to operate on either alternating or direct current. Under some circumstances of use it is desirable that the motor be enclosed so as to substantially isolate the motor from the environment in which it is used. This may be necessary to protect the motor from dirt, moisture, chemical fumes, or other harmful ingredients of the surrounding atmosphere. Such enclosed motors are also useful where the surrounding atmosphere contains flammable vapors, such as paint solvents. Obviously, a limiting factor in the use of a totally enclosed electric motor is the ability to cool the motor so as to prevent excessive heat build up and possible damage to the motor resulting therefrom.

The characteristics of an induction motor dictate that it run at a specific speed determined by or as a function of the frequency of the alternating current input. Also, such motors have a low starting torque and draw a great deal of current at starting. With respect to a d-c motor, since two curved permanent magnets are utilized for the stator and these have very small spaces therebetween in the circumferential direction, there is effectively no space for cooling air to pass so that there results a negligible cooling effect in the internal mechanisms of the machine. Also, the jacket holding the permanent magnets must be made of steel which is not a good heat conductor. Thus, in order to cool a d-c motor, massive amounts of air must be blown over the housing. D-c motors, furthermore, are inherently relatively low speed motors. Universal motors on the other hand, tend to be relatively high and speed motors, wherein the speed can be varied and such motors do not draw a high current on starting.

One industry which utilizes electric motors is the professional and industrial painting industry, where portable spray painting equipment is utilized extensively in the painting of new constructions and the re-painting of buildings. In this industry the paint is sprayed onto the surface being painted usually by the hydraulic atomization thereof wherein the liquid paint is pumped to a pressure of two to three thousand p.s.i. and released through a nozzle whereby it is atomized into a spray. The heaviest piece of equipment utilized in such a spray painting system is the pump which includes the motor therefor. Both electrically powered and gasoline powered motors are utilized in driving such pumps, however, the electric motor is preferred where electric power is available because it is smaller, lighter, less noisy and cleaner than the comparable gasoline powered engine. Such motors are required to start and stop frequently in dependance on the pressure requirements of the paint. However, difficulty arises where such painting requires the use of solvents which permeate the surrounding atmosphere and which may be inflammable. In such a situation, a totally enclosed electric motor may be necessary. The problem in providing a totally enclosed electric motor which is small and hand portable, involves adequate cooling of the motor as noted above. A portable, totally enclosed electric motor for such industrial painting currently on the market, utilizes a thermal switch which shuts the motor off before it becomes too hot and does not permit the motor to restart until the motor has cooled sufficiently. The drawback to his solution is that the operation of the motor is essentially out of the control of the operator and results in substantial down time in painting operations.

It is, therefore, the object of the present invention to provide a totally enclosed electric motor which can be constructed small enough to be portable and have a relatively high power output and high speed which is still sufficiently cooled to permit continuous operation when necessary.

The above object is accomplished in accordance with the present invention by providing an electric motor which is totally enclosed and which includes both an internal ventilation system and an external ventilation system. The motor housing is formed of a high heat conducting material, such as aluminum, having an elongate shape with a substantially square cross-section and a circular axial bore therethrough defining a cylindrically shaped internal wall which may be in the form of a sleeve. The field is secured in this sleeve while the armature, which is supported at the front and rear motor housings, is adapted to rotate in the field. The rear motor housing divides the rear of the motor into two axially adjacent fan compartments, one adjacent the armature for the internal ventilation system and the second for the external ventilation system. The fan in the external fan compartment takes air in from the outside and moves it radially into and along a series of longitudinally extending annular external ducts in the motor housing which air removes heat by means of convection from the floors of these ducts and transports the same into parallel, laterally arranged exhaust compartments formed in the front motor housing which exhaust this heated air into the atmosphere. The fan in the internal ventilation system moves air radially in the internal fan compartment to a series of longitudinally extending annular internal ducts surrounding the cylindrical internal wall or sleeve and longitudinally along these ducts. The moving air removes heat from the internal wall or sleeve which itself has conducted heat away from the field and through convection removes it radially into the motor housing to be removed through the external ducts and by contact of the atmosphere with the outside surfaces of the motor housing. The internal ventilating air is then forced forwardly toward the front motor housing where, in addition to the exhaust compartments, a brush compartment is formed into which this air passes where it is specifically directed around the brushes and the commutator before passing through the armature and field and being returned to the internal fan compartment.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

Figure 1:
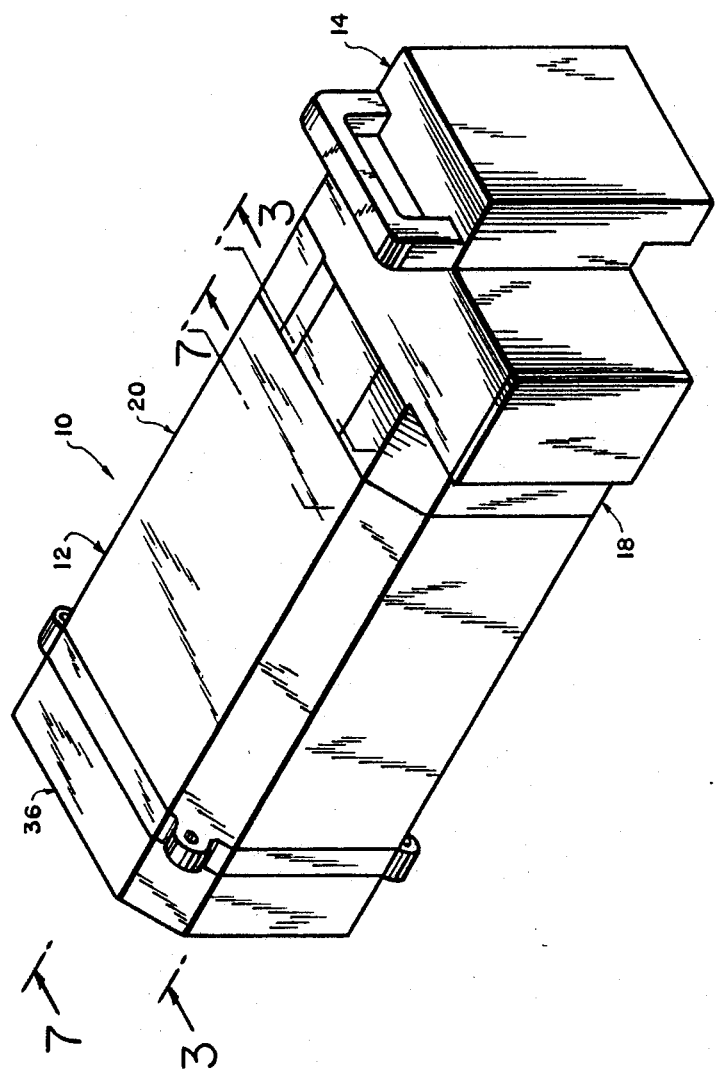
FIG. 1 is a perspective view of a hydraulic paint pump incorporating the totally enclosed electric motor according to the present invention.
Figure 2A:
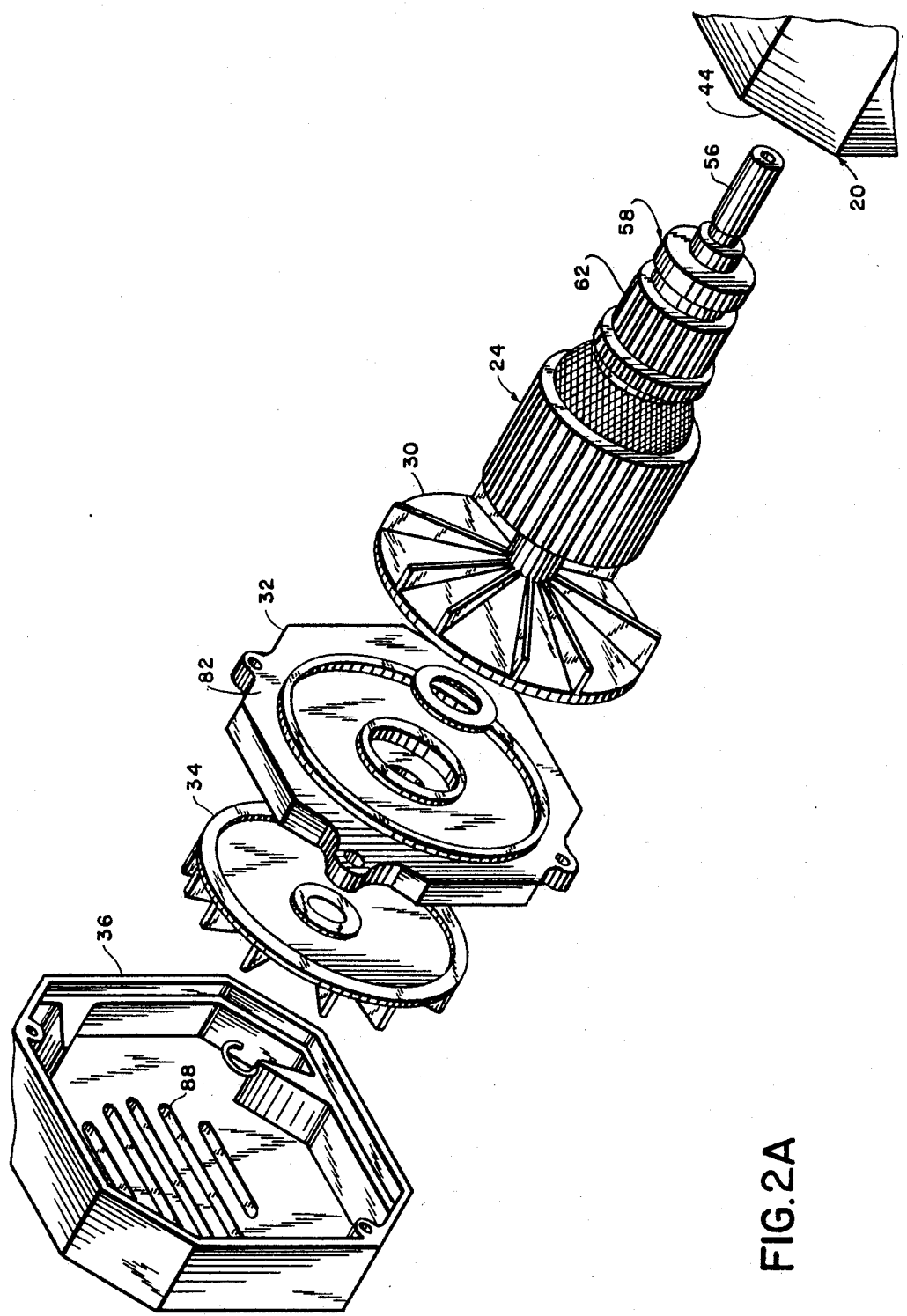
FIG. 2A-2B is an exploded view of the totally enclosed electric motor according to the present invention showing a portion of the housing therefor broken away.

Now turning to the drawings, there is shown in FIG. 1 an electrically operated hydraulic paint pump, designated 10, consisting of a totally enclosed electric motor 12 of the universal type which drives a hydraulic pump 14. As clearly seen in FIG. 2A-2B the operating gears (not shown) of hydraulic pump 14 are housed within a pump housing 16 which is formed as part of front motor housing 18 of electric motor 12. Electric motor 12 consists of an outer housing assembly 20, a field 22, an armature 24, a brush holder assembly 26, brushes 28, internal fan 30, rear motor housing 32, external fan 34, rear cover 36 and motor starter 38. While a universal type motor is described herein, the same principles concerning the cooling thereof would also apply to induction and d.c. motors.

Outer housing assembly 20 consists of a substantially square, extruded outer housing 40 formed of aluminum having a cylindrically shaped aluminum sleeve 42 coaxially mounted therein. The four corners 44 of outer housing 40 are preferably beveled as clearly seen in FIG. 2A-2B. Field 22 consists of a pair of diametrically opposed field coils 46 and 48 (see FIGS. 3 and 7) and laminations 50 which surround the windings 54 of armature 24. Field 22 is secured in sleeve 42 against rotation as described hereinafter. Armature 24, in addition to windings 54, includes axial shaft 56, which is journaled for rotation in front motor housing 18 and rear motor housing 32 by means of bearings 58 and 60 respectively, and commutator 62. Brush holder assembly 26 is formed of plastic material and consists of a circular plate 64 co-extensive with cylindrical sleeve 42 having a central opening 66 therein through which commutator 62 extends and a coaxial, axially extending sleeve 68 which is axially co-extensive with commutator 62 and radially co-extensive with central opening 66. Circular plate 64 and sleeve 68 support diametrically opposed brush holders 70 which, with the help of brush retainers 72, maintain brushes 28 in contact with commutator 62. Brush holder assembly 26 is fixedly secured to outer housing assembly 20 by means of screws 74 and it also prevents field 22 from rotating by causing studs 76 which extend from the rear of circular plate 64 and to enter into corresponding openings 78 in field 22.

At the rear of motor 12, on the side of armature 24 opposite commutator 62, internal fan 30 is fixedly mounted to shaft 56 in internal fan compartment 80 of motor 12. Internal fan 30 circulates air for the internal ventilation system (hereinafter described) of motor 12. Rear motor housing 32, which supports shaft 56 by means of bearing 60 is fastened to outer housing 20 so that face 82 thereof seals against face 84 of outer housing 20 thereby sealing internal fan compartment 80. External fan 34 is fixedly mounted to shaft 56 in external fan compartment 86 separated from internal fan compartment 80 by rear motor housing 32. External fan 34 circulates cooling outside air for the external ventilation system (hereinafter described) to remove heat from motor 12. Rear cover 36 is fastened to rear motor housing 32 thereby enclosing external fan compartment 86 and is provided with openings 88 through which outside air is drawn into compartment 86.

Figure 2B:
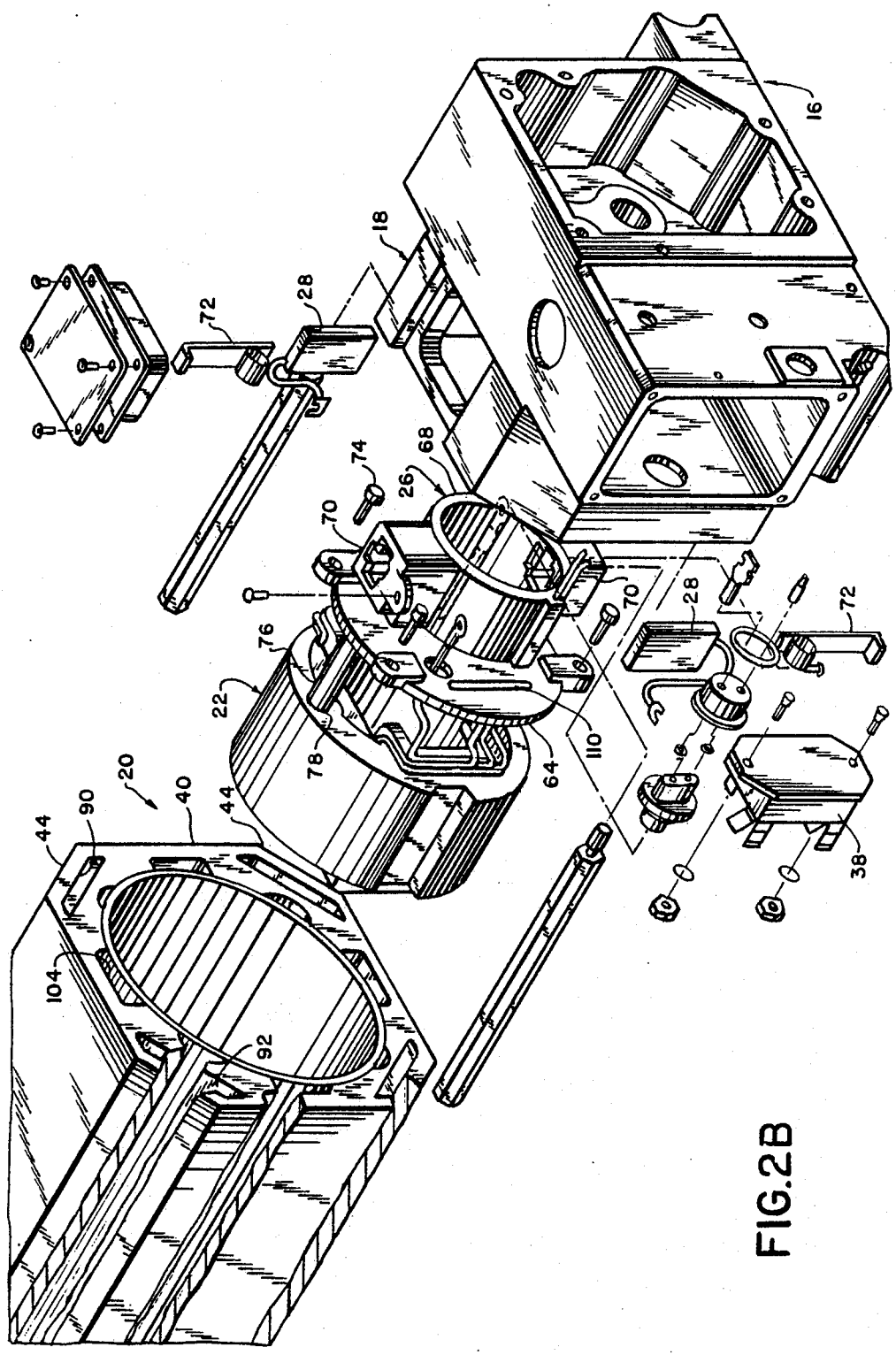
Figure 3:
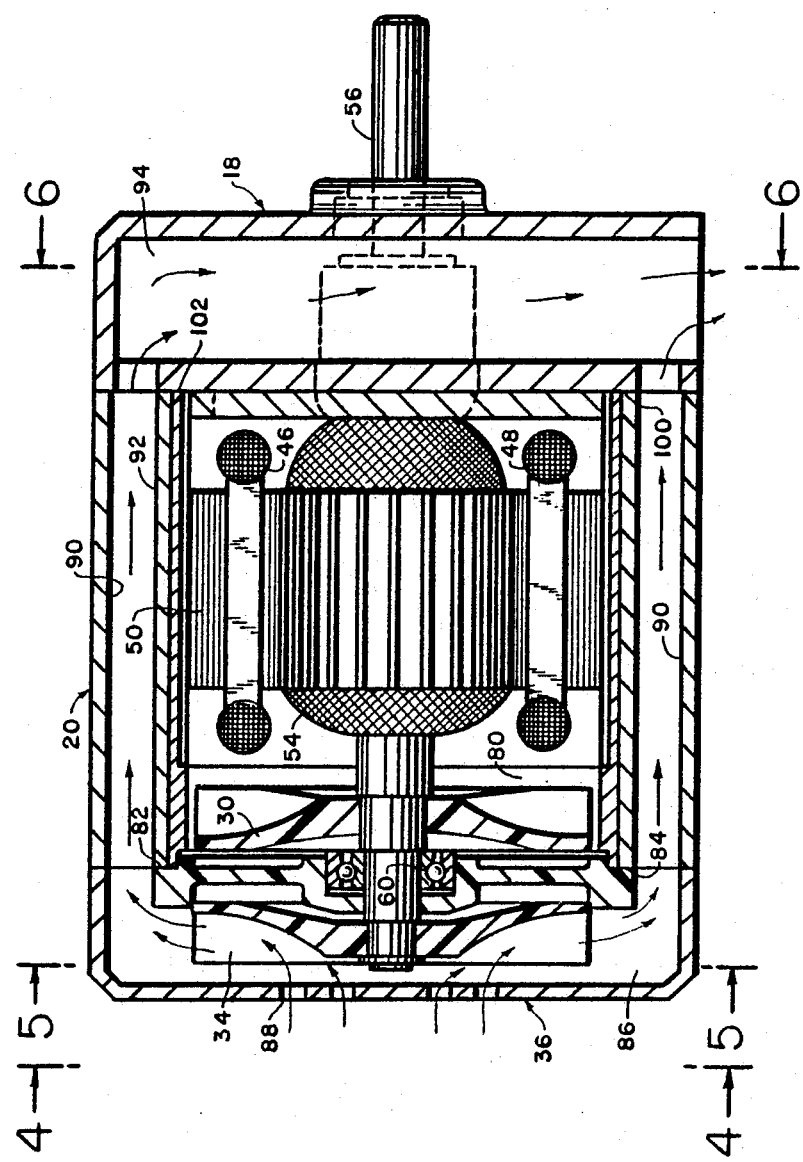
FIG. 3 is a cross-sectional view of the totally enclosed electric motor of FIG. 1 taken along line 3—3 of FIG. 1.
Figure 4:
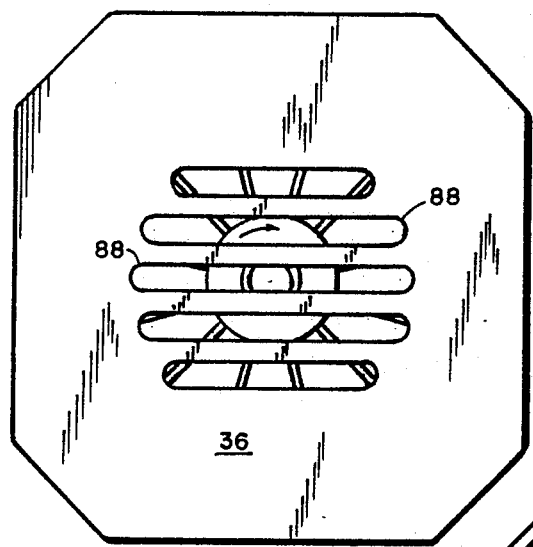
FIG. 4 is a rear elevational view of the electric motor of FIG. 3 taken along line 4—4 of FIG. 3.
Figure 5:
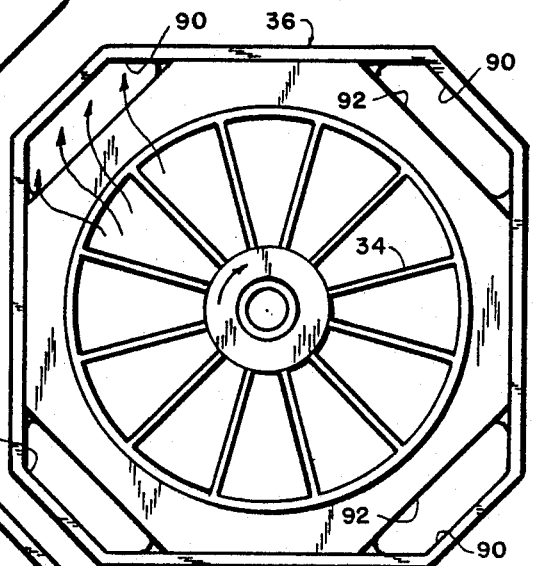
FIG. 5 is a cross-section view of the electric motor of FIG. 3 taken along line 5—5 of FIG. 3.
Figure 6:
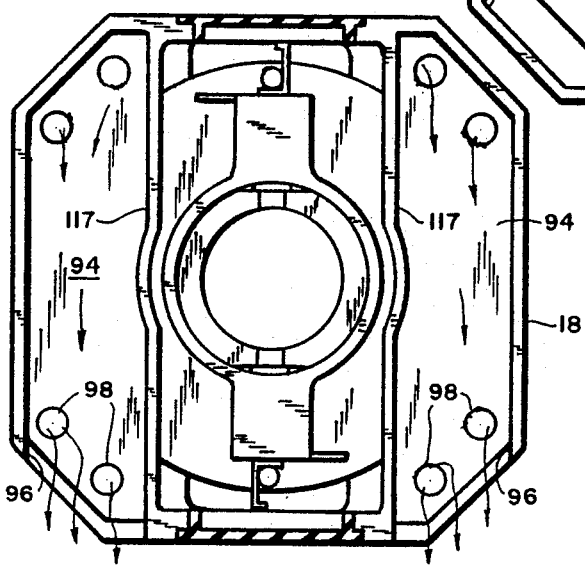
FIG. 6 is a cross-sectional view of the electric motor of FIG. 3 taken along line 6—6 of FIG. 3.

The external ventilation system shown in FIG. 3, in addition to external fan 34 and external fan compartment 86, also includes a series of four ducts, designated 90, one in each corner 44 of housing 20, which are substantially parallel to the bevel of corners 44 and run the length of housing 20, as clearly seen in FIG. 2B. Ducts 90 communicate with external fan compartment 86 so that cooling outside air drawn in through openings 88 is moved radially outwardly by external fan 34 and into and along ducts 90, as clearly seen in FIG. 5. The cooling air moving along ducts 90, as shown in FIG. 3, removes heat from the walls 92 thereof by means of convection and carries the same to the front of motor 12 to be exhausted. Each pair of ducts 90 vertically arranged from each other communicates with a respective exhaust compartment 94 disposed on lateral sides of front motor housing 18, as clearly seen in FIGS. 3 and 6. Each exhaust compartment 94 exhausts to the atmosphere through openings 96 at the bottom of front housing 18. Ducts 90 communicate with compartments 94 through holes 98 in sealing face 100 of front housing 18. Face 100 of front housing 18 seals against front face 102 of outer housing assembly 20 as shown in FIGS. 3 and 7, thereby segregating the internal and external ventilation systems from each other at front motor housing 18.

Figure 7:
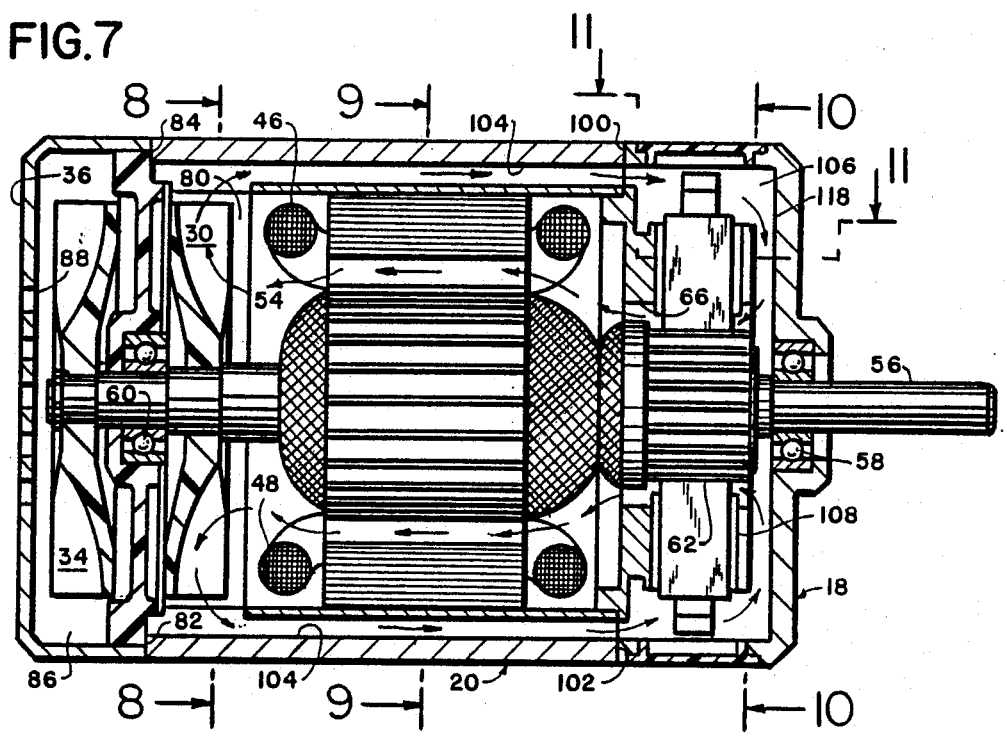
FIG. 7 is a cross-sectional view of the electric motor of FIG. 1 taken along line 7—7 of FIG. 1.
Figure 10:
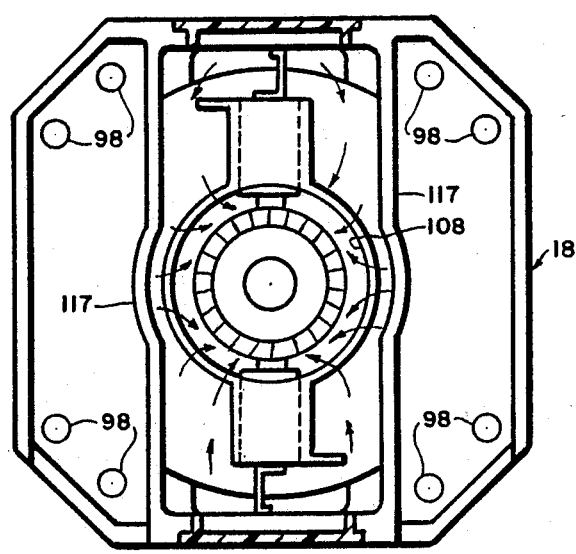
FIG. 10 is a cross-sectional view of the electric motor of FIG. 7 taken along line 10—10 of FIG. 7.

The internal ventilation system shown in FIG. 7, in addition to internal fan 30 and internal fan compartment 80, also includes a series of ducts 104 arranged at 45° intervals on the periphery of aluminum sleeve 42. As clearly seen in FIG. 8, ducts 104 form a substantially annular, discontinuous channel adjacent sleeve 42 having a series of pedestals 105 supporting sleeve 42. Four of ducts 104 corresponding with corners 44 of outer housing assembly 20 are radially, inwardly adjacent to ducts 90 and are sealed therefrom by the sealing faces 82 and 84 of rear motor housing 32 and outer housing assembly 20, respectively. The remaining four ducts 104 are arranged adjacent the sides of outer housing assembly 20 so that each pedestal 105 is proximate to and substantially underlies ducts 90 of the external ventilation system. Ducts 104 discharge into brush compartment 106 in front motor housing 18 and, since the major exit from compartment 106 is through annular space 108 (see FIG. 10) defined between commutator 62 and the internal face of sleeve 68, the air passes therethrough and continues into the air gap between armature 24 and field 22. Air also exits from brush compartment 106 through lateral slit-like openings 110 in circular plate 64 of brush holder assembly 26 which are aligned with field windings 46 and 48, permitting air to cool these windings and also pass through lateral spaces 112 defined between the diametrically opposed windings. The air passing through and around armature 24 returns to internal fan compartment 80.

Figure 12:
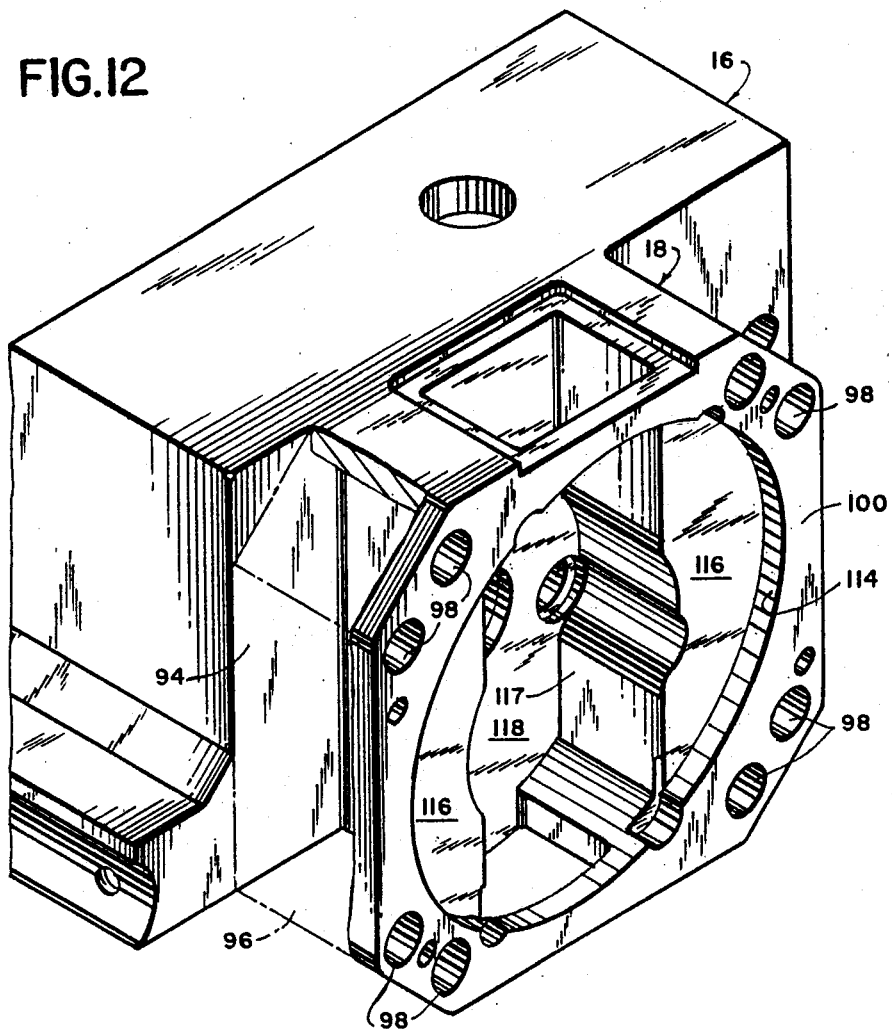
FIG. 12 is a perspective view of the front motor housing of the electric motor according to the present invention as viewed in the direction looking from the electric motor.

Brush compartment 106 is formed by the sealing effect of circular plate 64 against sleeve 42, the undercut 114 in face 100 of front motor housing 18 (see FIG. 12) which is radially coextensive with the annular, discontinuous channel around sleeve 42 defined by ducts 104, walls 116 and 117 of exhaust compartments 94 and front end wall 118 of front motor housing 18. Additional cooling of the internally circulating air occurs in brush compartment 106 because of the proximity of the passage of the externally circulating air through exhaust compartments 94. Heat transfer in this case is through walls 116 and 117 separating brush compartment 106 from exhaust compartments 94.

Figure 8:
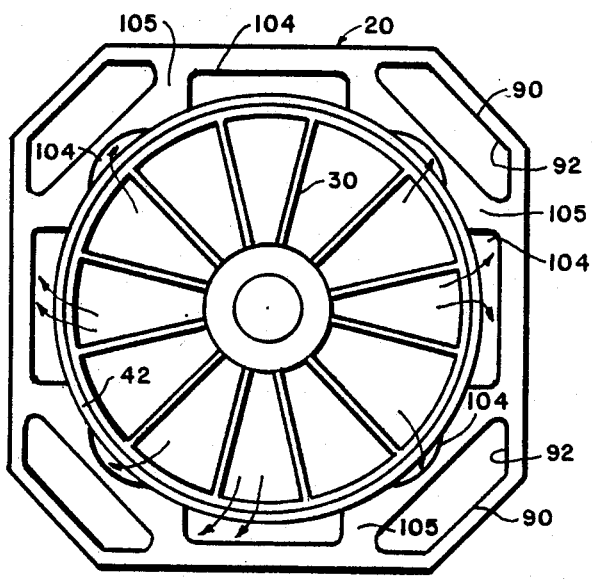
FIG. 8 is a cross-sectional view of the electric motor of FIG. 7 taken along line 8—8 of FIG. 7.
Figure 9:
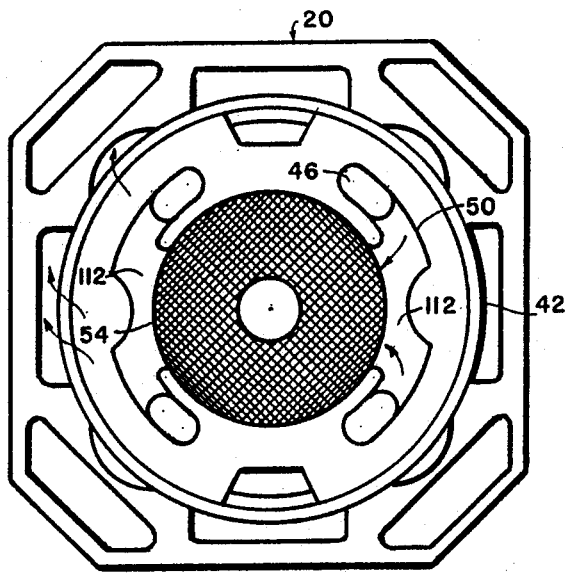
FIG. 9 is a cross-sectional view of the electric motor of FIG. 7 taken along line 9—9 of FIG. 7.

Thus, the internal ventilation for electric motor 12 is accomplished by fan 30 moving the air in internal fan compartment 80 radially and directing it into ducts 104 and therealong to brush compartment 106 as shown in FIGS. 7 and 8. While passing through ducts 104, the air picks up heat from aluminum sleeve 42 by convection which had been transmitted to sleeve 42 from field 22 with which it is in direct contact. This air then passes the picked up heat to the cooler surfaces of ducts 104, which surfaces are radially outward and which conduct the heat radially outwardly even further. In brush compartment 106, a portion of the air cools brushes 28, as described hereinafter, while part of the remainder of the air passes through annular space 108, cooling commutator 62, armature 24 and field 22 and part passes through openings 110, also cooling armature 24 and field 22. The air is then returned to internal fan compartment 80 and recirculated by internal fan 30. Thus, pedestals 105 conduct heat from sleeve 42 radially outwardly to ducts 90 and the air passing through ducts 104 pick up heat from sleeve 42 by convection and pass this heat to ducts 90 and to the outside surfaces of outer housing assembly 20 so that the external ventilating air passing through ducts 90 and the external atmosphere in contact with the outside surfaces of outer housing assembly 20 remove this heat by means of convection and dissipate the same.

Figure 11:
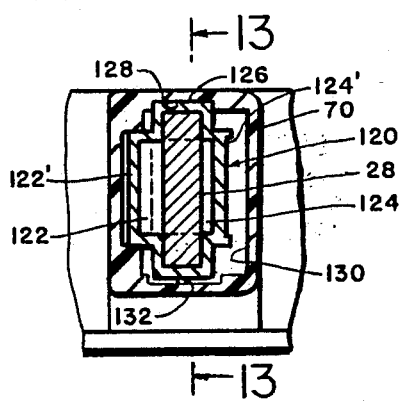
FIG. 11 is a cross-sectional view of a portion of the electric motor of FIG. 7 taken along line 11—11 of FIG. 7.
Figure 13:
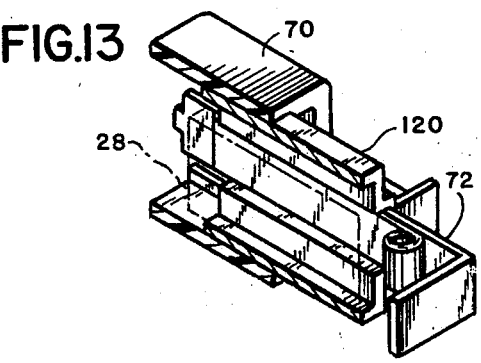
FIG. 13 is a cross-sectional view taken along the line 13—13 in FIG. 11.

With respect o the cooling of brushes 28 mounted in brush holders 70, sufficient spaces are provided around each brush 28 for the internal ventilating air passing into brush compartment 106 to carry away the heat generated by the arcing between brushes 28 and commutator 62. As clearly seen in FIG. 11, each rectangular brush 28 is mounted in a brush support 120, preferably formed of high heat conductive material such as aluminum, so that its shorter sides are firmly held therein while open channels 122 and 124 are provided along its longer sides. Channel 122 is deeper than channel 124 and is adapted to accept therein brush retainer 72, as clearly seen in FIG. 13. Aluminum support 120 is substantially rectangular in overall shape with its longer sides having rectangularly shaped distensions 122' and 124' corresponding to channels 122 and 124. The forward facing short side 126 of support 120 is adapted to closely fit into recess 128 in the forward side of generally rectangular internal wall 130 of brush holder 70. Brush support 120 is retained in brush holder 70 by being wedged into recess 128 by means of pin 132 in wall 130 oppositely disposed from recess 128. As clearly seen in FIG. 11, substantially the three sides of brush support 120 other than side 126 make no contact or only point contact with wall 130 of brush holder 70 so that internal ventilation air passes thereby as well as the long sides of brush 28 to remove heat therefrom.

While only a single embodiment of the present invention has been shown and described, it will be obvious that many changes and modifications may be made thereunto without departing from the spirit and scope of the invention.

What is claimed is:

1. In a totally enclosed electromotive device having a stator and a rotor in a stator-rotor arrangement, said stator being fixedly supported by an internal cylindrical wall of a main housing for said device and the rotor being rotatably mounted in front and rear housings of said device on suitable bearings therein, said front and rear housings being detachably secured to said main housing, the improvement comprising:
    an internal ventilation system comprising an internal fan driven by said rotor disposed in an internal fan compartment defined between said stator-rotor arrangement and said rear housing, a series of annular internal longitudinally extending ducts surrounding the internal cylindrical wall of the main housing and communicating with said fan compartment, and means for directing the internal ventilating air from said internal ducts to said stator-rotor arrangement to return to said internal fan compartment, and
    an external ventilation system comprising an external fan driven by said rotor disposed in an external fan compartment defined by said rear housing and an exterior rear cover, said rear housing sealing said external fan compartment from said internal ventilation system, a series of annular external longitudinally extending ducts in said main housing discharging into exhaust compartment which exhausts to the atmosphere arranged in said front housing, said exhaust compartment means being sealed from said internal ventilation system by said front housing.

2. The totally enclosed electromotive device as defined in claim 1, wherein said device further includes a commutator arranged on said rotor at the end thereof supported by the front housing and a pair of oppositely disposed brushes in contact with said commutator, the internal ventilation system further including a brush compartment for said brushes defined between said front housing and said stator-rotor arrangement and communicating with said series of internal ducts, means for directing the internal ventilating air in said brush compartment to remove heat from said brushes, and means for directing the internal ventilating air in said brush compartment to remove heat from said commutator.

3. The totally enclosed electromotive device as defined in claim 2, wherein said means for directing internal ventilating air to remove heat from said commutator comprises a wall element separating said stator-rotor arrangement from said brush compartment radially co-extensive with the internal cylindrical wall of said main housing, said wall element having an opening therein co-axial with said rotor and a sleeve co-extensive with said opening which forms an annular channel with said commutator so that internal ventilating air in said brush compartment is directed axially along said commutator to said stator-rotor arrangement to return to said internal fan.

4. The totally enclosed electromotive device as defined in claim 3, wherein said means for directing internal ventilating air to remove heat from said brushes comprises for each rectangularly shaped brush a brush support which engages the short sides of said brush and provides open channels along the long sides of said brush, and a brush holder integral with said sleeve in said brush compartment associated with said commutator opening into the annular channel defined therebetween which fixedly engages said brush support therein and forms open channels substantially therearound which, together with the open channels between said brush and said brush support, communicate between said brush compartment and the annular channel surrounding said commutator.

5. The totally enclosed electromotive device as defined in claim 3, wherein said sleeve is axially co-extensive with said commutator.

6. The totally enclosed electromotive device as defined in claim 1, wherein said series of annular external ducts are arranged radially outwardly in said main housing relative to said series of annular internal ducts.

7. The totally enclosed electromotive device as defined in claim 6, wherein said main housing is substantially square in cross-section and said series of external ducts are so arranged that there is an external duct at least at each cross-sectional corner of said main housing.

8. The totally enclosed electromotive device as defined in claim 7, wherein said series of annular internal ducts surrounding the internal cylindrical wall of the main housing defines a substantially annular, discontinuous channel radially outwardly adjacent said cylindrical wall having an arrangement of pedestals connecting said cylindrical wall with said main housing.

9. The totally enclosed electromotive device as defined in claim 8, wherein said pedestals are arranged to be radially aligned with said external ducts.

10. The totally enclosed electromotive device as defined in claim 1, wherein sad main housing and front and rear housings are formed of a material of high heat conductivity.

11. The totally enclosed electromotive device as defined in claim 10, wherein said material is aluminum.

12. The totally enclosed electromotive device as defined in claim 1, wherein said internal cylindrical wall is an element separate from said main housing.

13. The totally enclosed electromotive device as defined in claim 7, wherein the exhaust compartment means arranged in said front housing comprises two compartments into each of which two external ducts exhaust, said exhaust compartments being laterally arranged in said front housing and each vertically arranged from each other of said exhaust compartments exhausts to the atmosphere at a lateral side of said front housing.

14. The totally enclosed electromotive device as defined in claim 2, wherein said exhaust compartment means is arranged adjacent said brush compartment so that the air passing through said exhaust compartment means is adapted to remove heat from the wall separating the brush compartment and exhaust compartment means transferred thereto from the internal air passing through the brush compartment.

15. The totally enclosed electromotive device as defined in claim 3, wherein said wall element separating said stator-rotor arrangement from said brush compartment includes at least a second opening therein aligned with the heat producing element of the stator of the stator-rotor arrangement.

16. The totally enclosed electromotive device as defined in claim 3, wherein said wall element separating the stator-rotor arrangement and the brush compartment and the sleeve connected thereto are formed of plastic.

* * * * *